United States Patent
Kato et al.

(10) Patent No.: US 6,483,970 B2
(45) Date of Patent: Nov. 19, 2002

(54) FIBER OPTIC CABLE AND OPTICAL TRANSMISSION SYSTEM

(75) Inventors: Takatoshi Kato, Yokohama (JP); Masayuki Nishimura, Yokohama (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 0 days.

(21) Appl. No.: 09/768,353

(22) Filed: Jan. 25, 2001

(65) Prior Publication Data

US 2001/0028773 A1 Oct. 11, 2001

(30) Foreign Application Priority Data

Jan. 26, 2000 (JP) ........................................ 2000-017308

(51) Int. Cl.⁷ ................................................. G02B 6/44
(52) U.S. Cl. ......................... 385/109; 385/102; 385/110
(58) Field of Search ................................. 385/109, 102, 385/105, 110, 123

(56) References Cited

U.S. PATENT DOCUMENTS

| | | | |
|---|---|---|---|
| 5,455,881 A | * 10/1995 | Bosisio et al. | 385/100 |
| 5,613,027 A | * 3/1997 | Bhagavatula | 385/123 |
| 5,802,285 A | * 9/1998 | Akasaka | 385/123 |
| 5,838,867 A | * 11/1998 | Onishi et al. | 385/123 |
| 6,374,027 B1 | * 4/2002 | Onishi et al. | 385/123 |

OTHER PUBLICATIONS

"Temperature dependence of chromatic dispersion in dispersion–shifted fibers: Experiment and analysis", K.S. Kim et al., J. Appl. Phys. 73(5), Mar. 1, 1993, pp. 2069–2074.*

"Temperature–independent 80 Gbit/s OTDM Transmission Experiment Using Zero–Dispersion–Flattened Transmission Line", K. Yonenaga et al., ECOCC'99, Sep. 26–30, 1999, Nice, France, pp. 34–35.*

"Reduced Dispersion Slope, Non–zero Dispersion Fiber", D.W. Peckham et al., ECOC'98, Sep. 20–24, 1998, Madrid, Spain, pp. 139–140.*

"Fully electrical 40–Gbit/s TDM system prototype and its application to 160–Gbit/s WDM transmission", M. Yoneyama et al., OFC'99, 1999, pp. 128–130.*

* cited by examiner

Primary Examiner—Akm E. Ullah
Assistant Examiner—Jennifer Doan
(74) Attorney, Agent, or Firm—McDermott, Will & Emery

(57) ABSTRACT

A fiber optic cable is provided which can perform a long-distance signal light transmission at high bit rates even if any temporal temperature change or regional temperature difference occurs. Also provided is an optical transmission system in which signal light can be transmitted at high bit rates over a long distance, from a transmitting station to a receiving station, even if a temporal temperature change or a regional temperature difference occurs to the fiber optic cables installed between the transmitting station and the receiving station. The fiber optic cable comprises a plurality of optical fibers bundled therein having an absolute value of 0.001 ps·nm$^{-1}$·km$^{311}$ ·K$^{-1}$ or less, more preferably 0.0005 ps·nm$^{-1}$·km$^{-1}$·K$^{-1}$ or less, of chromatic dispersion variation quantity per unit temperature at a wavelength of 1550 nm. The fiber optic cable preferably has a loose tubal structure or loose slotted structure.

8 Claims, 8 Drawing Sheets

FIBER OPTIC CABLE AND OPTICAL TRANSMISSION SYSTEM

BACKGROUND OF THE INVENTION

1. Field of the Invention

The present invention relates to a fiber optic cable comprising a plurality of optical fibers bundled therein and to an optical transmission system in which the fiber optic cable is installed as an optical transmission line.

2. Related Background Arts

In optical communications performed at high speed such as tens of Gb/s by means of a fiber optic cable, the waveform degradation of signal light due to the chromatic dispersion inherent in an optical fiber becomes a problem. The higher the bit rates of signal light, the smaller absolute value of the accumulation of the chromatic dispersions of an optical fiber is required between the transmitting end and the receiving end. Therefore, dispersion-shifted optical fibers having a zero dispersion wavelength in the 1.55 $\mu$m band, in which signal light exists, are used.

However, even in the case of a fiber optic cable in which the dispersion-shifted optical fibers are bundled, the absolute value of the chromatic dispersion of the optical fibers increases depending on temperature fluctuations in the environment where the fiber optic cable is installed. Consequently, there are cases where the level of waveform degradation of signal light becomes too high to ignore for transmitting signal light at high bit rates.

It is reported in Literature 1: Kwang S. Kin, et al., "Temperature Dependence of Chromatic Dispersion in Dispersion-shifted Fibers: Experiment and Analysis", J. Appl. Phys., Vol.73, No.5, pp.2069–2074 (1993) that the variation quantity per unit temperature of the chromatic dispersion of a dispersion-shifted optical fiber is about −0.0023 to −0.0015 ps·nm$^{-1}$·km$^{-1}$·K$^{-1}$. With such an optical fiber, signal light can be transmitted only about 200 km distance, when the bit rates are 40 Gb/s.

On the other hand, the technology described in Literature 2: K. Yonenaga, et al., "Temperature-independent 80 Gbit/s OTDM Transmission Experiment Using Zero-dispersion-flattened Transmission Line", ECOC '99 (1999) is intended for solving the problem of fluctuations in accumulated values of the chromatic dispersions due to temperature fluctuations. By coupling two kinds of optical fibers, which are different from each other in temperature dependence of the chromatic dispersion, the temperature dependence of accumulated chromatic dispersions is reduced to achieve a long-distance signal light transmission at high bit rates.

The technology described in Literature 2 is based on the assumption that the temperature is constant over the full length of a transmission line and no consideration is given to the environment where a fiber optic cable is actually to be installed. However, fiber optic cables are generally installed under a natural environment, such as in the ground or the ocean floor. Consequently, the temperatures of the two kinds of optical fibers thus connected occasionally differ from one another due not only due to temperature fluctuations because of the temporal changes such as seasons, day or night, but also to temperature differences because of regional changes. In such cases, the temperature dependence of the accumulated value of the chromatic dispersions will not be reduced, and accordingly long-distance signal light transmission cannot be performed at high bit rates.

SUMMARY OF THE INVENTION

An object of the present invention is to provide a fiber optic cable that can perform long-distance signal light transmission at high bit rates not withstanding any temporal temperature change or regional temperature difference.

Another object of the present invention is to provide an optical transmission system in which signal light can be transmitted at high bit rates over a long distance, from a transmitting station to a receiving station, notwithstanding a temporal temperature change or a regional temperature difference to the fiber optic cables installed between the transmitting station (or a relay station) and the receiving station (or a relay station).

To achieve the above-mentioned objects, herein provided is a fiber optic cable that comprises a plurality of optical fibers bundled therein which have an absolute value of 0.001 ps·nm$^{-1}$·km$^{-1}$·K$^{-1}$ or less of chromatic dispersion variation quantity per unit temperature at a wavelength of 1550 nm. Also provided is an optical transmission system in which such a fiber optic cable is installed as an optical transmission line.

The above and further objects and novel features of the invention will be more fully clarified from the following detailed description when the same is read in connection with the accompanying drawings. It is to be expressly understood, however, that the drawings are for the purpose of illustration only and are not intended as a definition of the limits of the invention.

BRIEF DESCRIPTION OF THE DRAWINGS

In order to more fully understand the drawings used in the detailed description of the present invention, a brief description of each drawing is provided.

DESCRIPTION OF THE PREFERRED EMBODIMENTS

Figure 1:
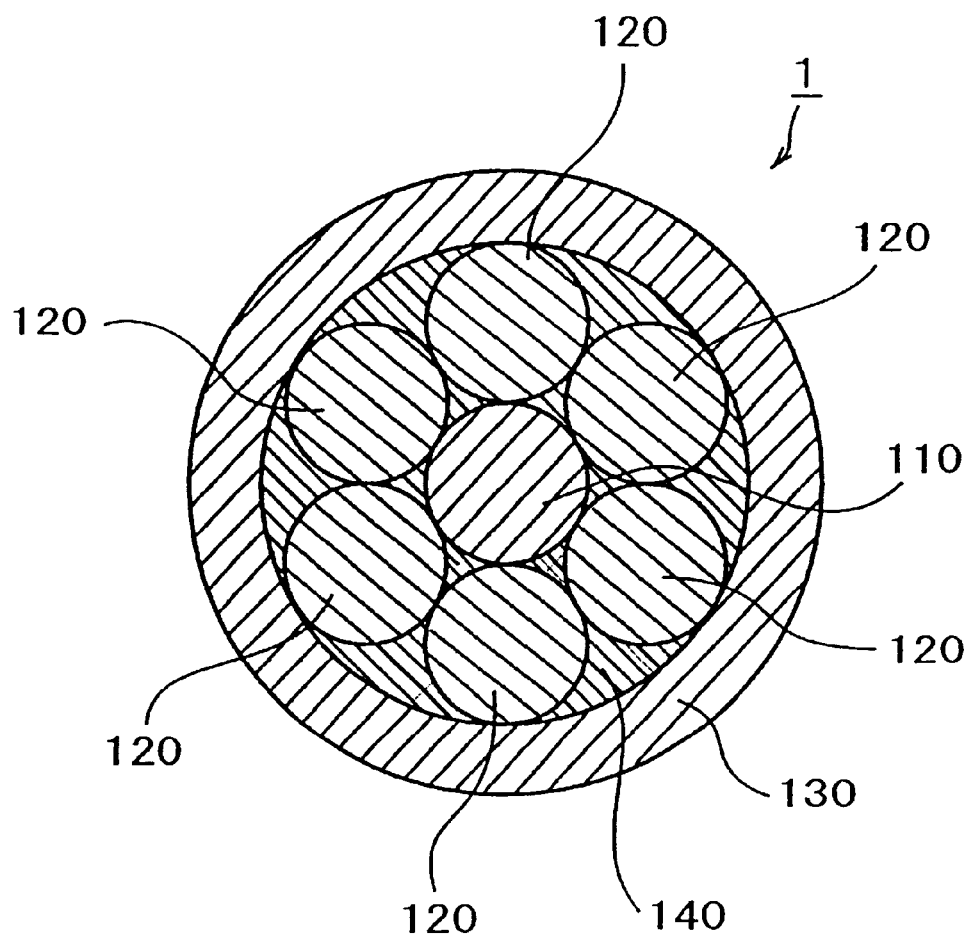
FIG. 1 is a section of a fiber optic cable having a unit structure.

In the following, the preferred embodiments of the present invention will be explained in detail with reference to the accompanying drawings. To facilitate the comprehension of the explanation, the same reference numerals denote the same parts, where possible, throughout the drawings, and a repeated explanation will be omitted. The dimensions in the drawings are partly exaggerated and do not always correspond to actual ratios of dimensions.

Figure 2:
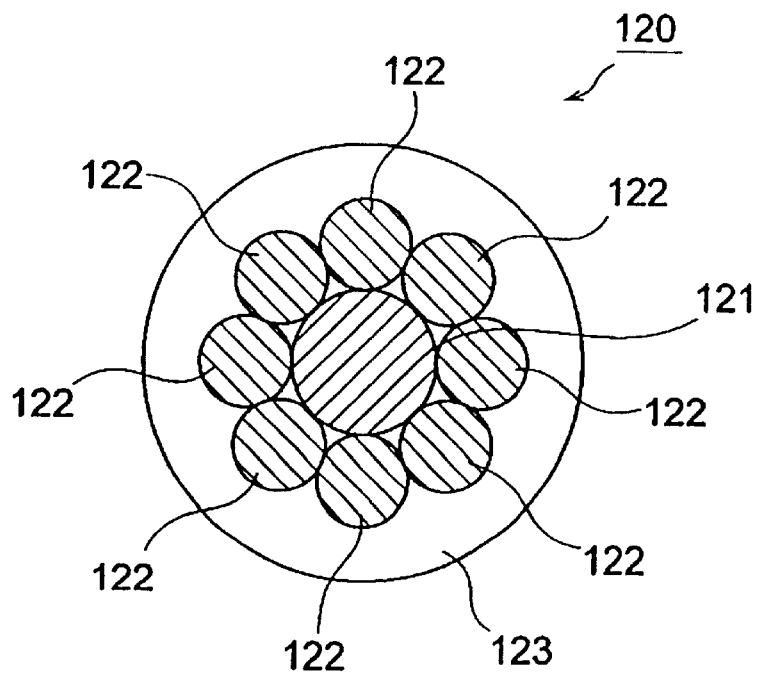
FIG. 2 is a section of each unit in the fiber optic cable having a unit structure.

First, a structure example of a fiber optic cable used in the present invention is explained. As shown in FIG. 1, a fiber optic cable 1 having a unit structure comprises six units 120 provided around a steel wire 110 and spirally extending in the longitudinal direction, and they are covered with an outer covering 130. The interstices between the steel wire 110, the units 120, and the outer covering 130 are filled with a resin 140. As shown in FIG. 2, each unit 120 comprises a plurality of optical fibers 122 provided around a steel wire 121 and spirally extending in the longitudinal direction, and they are covered with a resin 123.

Figure 3:
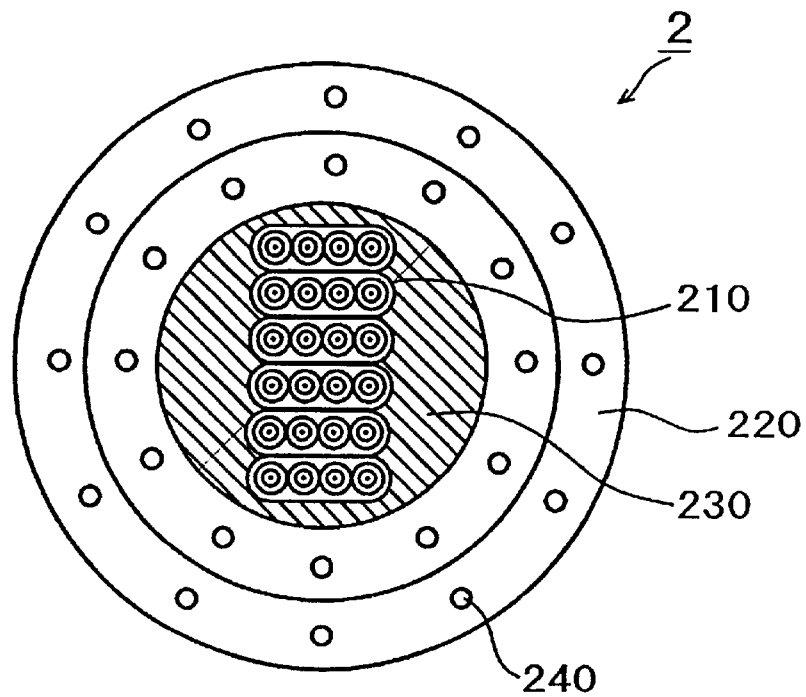
FIG. 3 is a section of a fiber optic cable having a loose tubal structure.
Figure 4:
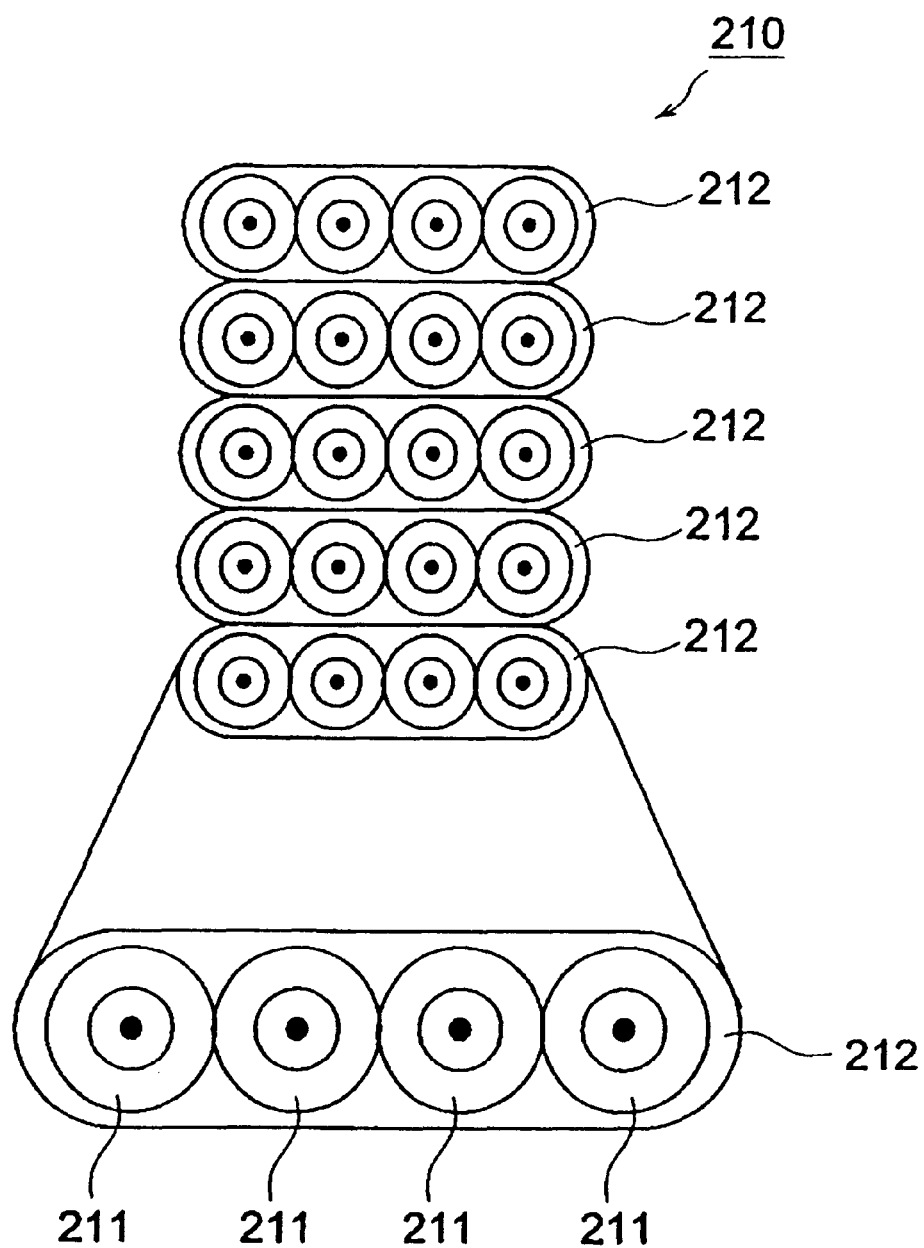
FIG. 4 is a section of a fiber ribbon stack in the fiber optic cable having a loose tubal structure or a loose slotted structure.

A fiber optic cable having a loose tube cable structure is an optical fiber cable in which the interstices between an outer covering and optical fibers or a fiber ribbon stack are vacant or filled with jelly. For example, as shown in FIG. 3, the fiber optic cable 2 having a loose tubal structure is formed such that a fiber ribbon stack 210 is covered with an outer covering 220, jelly 230 is filled in the interstices between them, and tensile strength members 240 are spirally embedded in the outer covering 220. The fiber ribbon stack 210 is a stack of fiber ribbons 212 each of which is made of a plurality of optical fibers 211 arrayed in parallel and covered with a resin as shown in FIG. 4.

Figure 5:
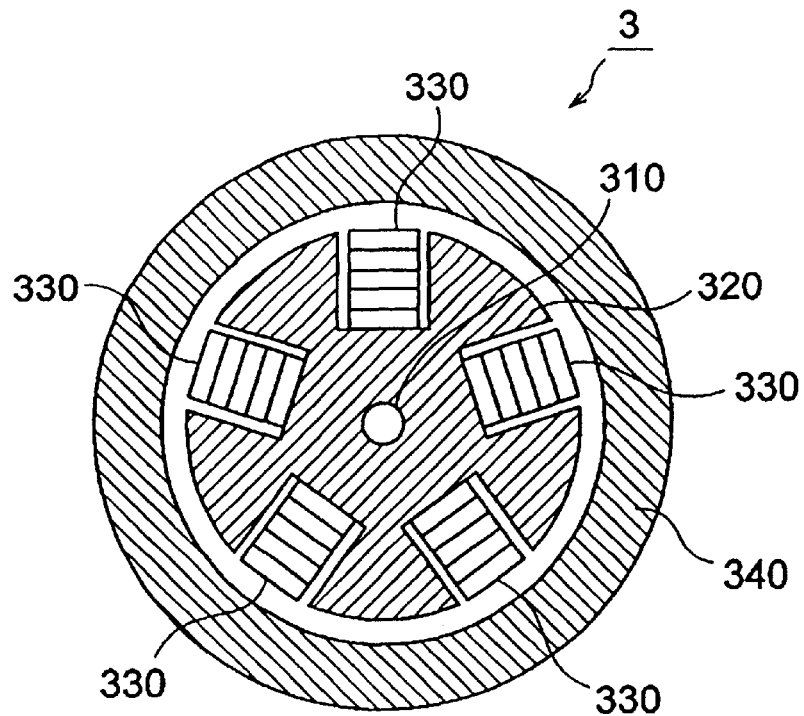
FIG. 5 is a section of the fiber optic cable having a loose slotted structure.

A fiber optic cable having a loose slotted structure is an optical fiber cable in which the interstices between the slotted rod and the outer covering are vacant or filled with jelly. For example, as shown in FIG. 5, the fiber optic cable 3 having a loose slotted structure is formed such that a tensile strength member 310 is longitudinally embedded in the center of the slotted rod 320, fiber ribbon stacks 330 are installed in the slots spirally formed in the longitudinal direction on the peripheral surface of the slotted rod 320, and they are covered with the outer covering 340. Each fiber ribbon stack 330 of the fiber optic cable is the same as the fiber ribbon stack 210 shown in FIG. 4.

Besides the types of fiber optic cables described above, it is possible to use other kinds of fiber optic cables for implementing the present invention. However, the loose tubal structure or the loose slotted structure is especially preferable. In these cases, since each optical fiber does not touch the outer covering directly, the fluctuations in the force applied to each optical fiber are small even if the temperature of the fiber optic cable changes, and hence the variation in the group velocity of signal light to propagate within the optical fiber is small. As a result, even if any temporal temperature change or regional temperature difference occurs, the transmission of signal light can be made over a long distance at high bit rates.

According to the present invention a plurality of optical fibers bundled in the fiber optic cable as described above, e.g., the optical fibers 122 and optical fibers 211, have an absolute value of 0.001 $ps \cdot nm^{-1} \cdot km^{-1} \cdot K^{-1}$ or less, preferably 0.0005 $ps \cdot nm^{-1} \cdot km^{-1} \cdot K^{-1}$ or less, of variation quantity per unit temperature of the chromatic dispersion at a wavelength of 1550 nm. The absolute value of variation quantity per unit temperature of the chromatic dispersion at a wavelength of 1550 nm may be within these ranges with respect to all of the optical fibers bundled in the fiber optic cable or some of the optical fibers bundled in the fiber optic cable. The transmission of signal light propagating through such optical fibers can be performed at high bit rates over a long distance.

Figure 6:
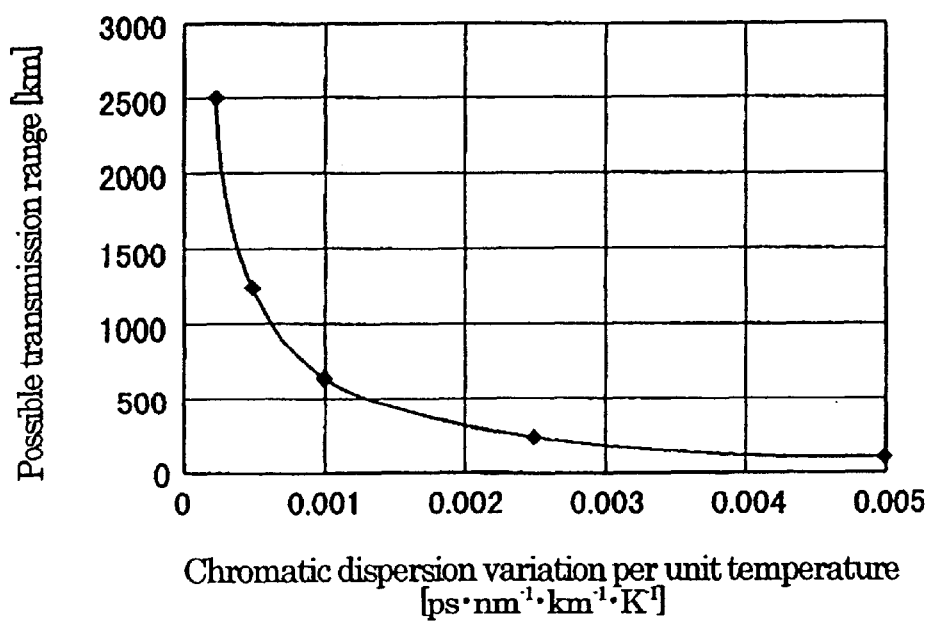
FIG. 6 is a graph showing the relations between chromatic dispersion variation quantity per unit temperature and possible transmission distance at bit rates of 40 Gb/s.

An explanation of the preference for these ranges is given in reference to FIG. 6. At bit rates of 40 Gb/s, the tolerance of accumulated chromatic dispersions of an optical fiber is 62.5 ps/nm. Assuming the permissible range of the temperature fluctuations is 100 K, there is a relation between a possible transmission range and a chromatic dispersion variation per unit temperature, as expressed by the expression "a possible transmission range=62.5/(100×chromatic dispersion variation per unit temperature )" as can be seen in the curve shown in FIG. 6.

When the absolute value of variation quantity per unit temperature of the chromatic dispersion of an optical fiber is 0.0025 $ps \cdot nm^{-1} \cdot km^{-1} \cdot K^{-1}$, the possible transmission range is only about 250 km. However, if the absolute value of variation quantity per unit temperature of the chromatic dispersion is equal to or less than 0.001 $ps \cdot nm^{-1} \cdot km^{-1} \cdot K^{-1}$, as in the case of the present invention, the possible transmission range is about 625 km or more. Also, if the absolute value of variation quantity per unit temperature of the chromatic dispersion is equal to or less than 0.0005 $ps \cdot nm^{-1} \cdot km^{-1} \cdot K^{-1}$, the possible transmission range is about 1250 km or more. Further, if the absolute value of variation quantity per unit temperature of the chromatic dispersion is equal to or less than 0.00025 $ps \cdot nm^{-1} \cdot km^{-1} \cdot K^{-1}$, the possible transmission range is about 2500 km or more. Therefore, a long-distance signal light transmission can be performed at high bit rates by using fiber optic cables according to the present invention notwithstanding a temporal temperature change or a regional temperature difference.

Next, the implementation examples of the fiber optic cables according to the present invention and a comparative example as well as the optical fibers bundled therein are explained. Table 1 is a chart that shows the specifications of the optical fibers used in respective implementation examples and the comparative example as well as the variation quantities per unit temperature of the chromatic dispersion of the optical fibers installed in the fiber optic cables.

TABLE 1

Figure 8:
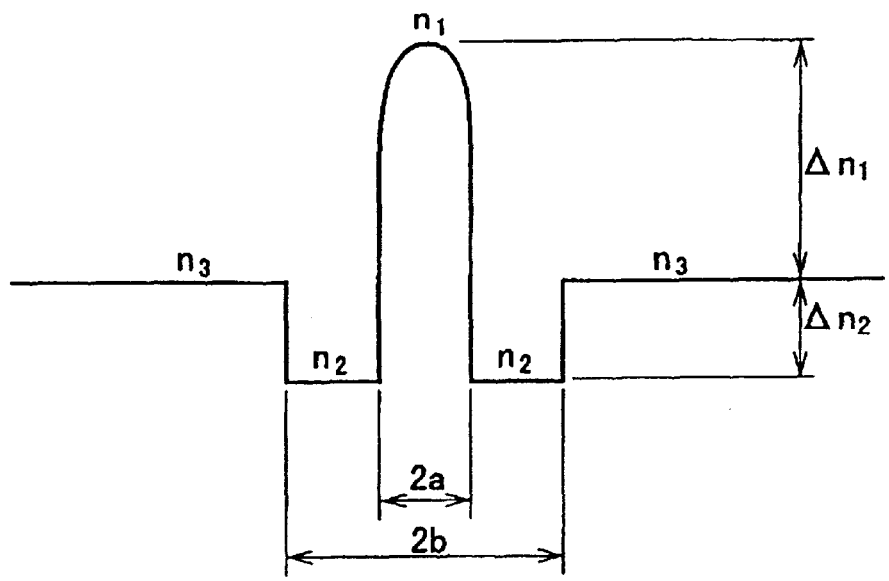
FIG. 8 shows a refractive index profile of an optical fiber according to Implementation Example 2.
Figure 9:
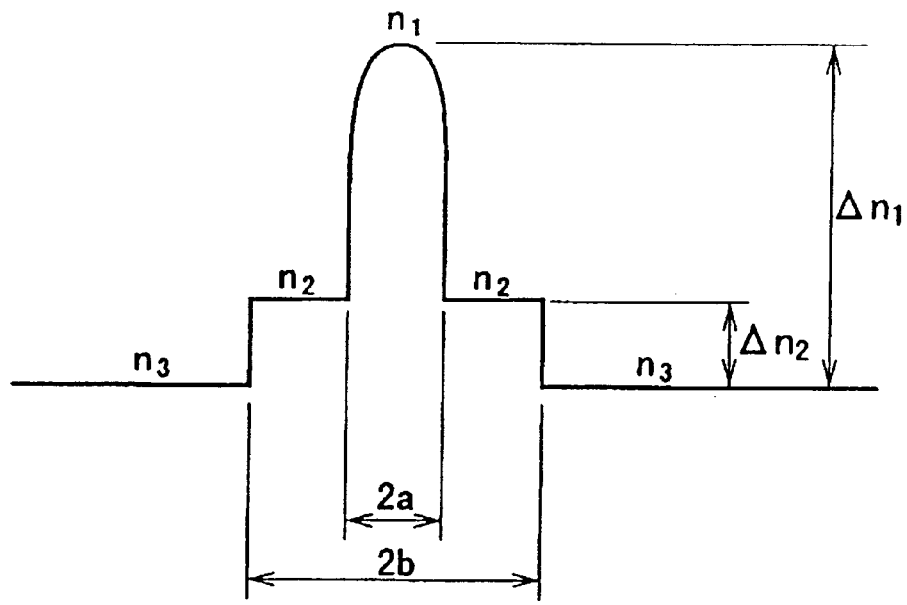
FIG. 9 shows a refractive index profile of an optical fiber according to Comparative Example.

| Example No. | Example 1 | Example 2 | Example 3 | Comparative Example |
|---|---|---|---|---|
| Refractive Index Profile | FIG. 8 | FIG. 9 | FIG. 8 | FIG. 9 |
| 2a ($\mu$m) | 5.3 | 7.9 | 5.6 | 3.9 |
| 2b ($\mu$m) | 14.4 | 14.9 | 15.1 | 19.1 |
| 2c ($\mu$m) | 22.2 | — | 23.2 | — |
| 2d ($\mu$m) | 44.4 | — | 46.4 | — |
| $\Delta n_1$ (%) | 0.60 | 0.63 | 0.54 | 0.90 |
| $\Delta n_2$ (%) | −0.06 | −0.30 | −0.15 | 0.10 |
| $\Delta n_3$ (%) | 0.24 | — | 0.26 | — |
| $\Delta n_4$ (%) | −0.06 | — | −0.15 | — |
| Effective Area ($\mu m^2$) | 47 | 38 | 51 | 58 |
| Chromatic Dispersion (ps · $nm^{-1}$ · $km^{-1}$) | 3.6 | 5.5 | −7.5 | −2.0 |
| Dispersion Slope (ps · $nm^{-2}$ · $km^{-1}$) | 0.024 | 0.013 | 0.008 | 0.090 |
| Cable Structure | Tight | Loose tube | Loose slot | Tight |
| Temp. Dep. Of Chromatic Dispersion (ps · $nm^{-1}$ · $km^{-1}$ · $K^{-1}$) | −0.0005 | −0.0004 | −0.0002 | −0.0025 |

Figure 7:
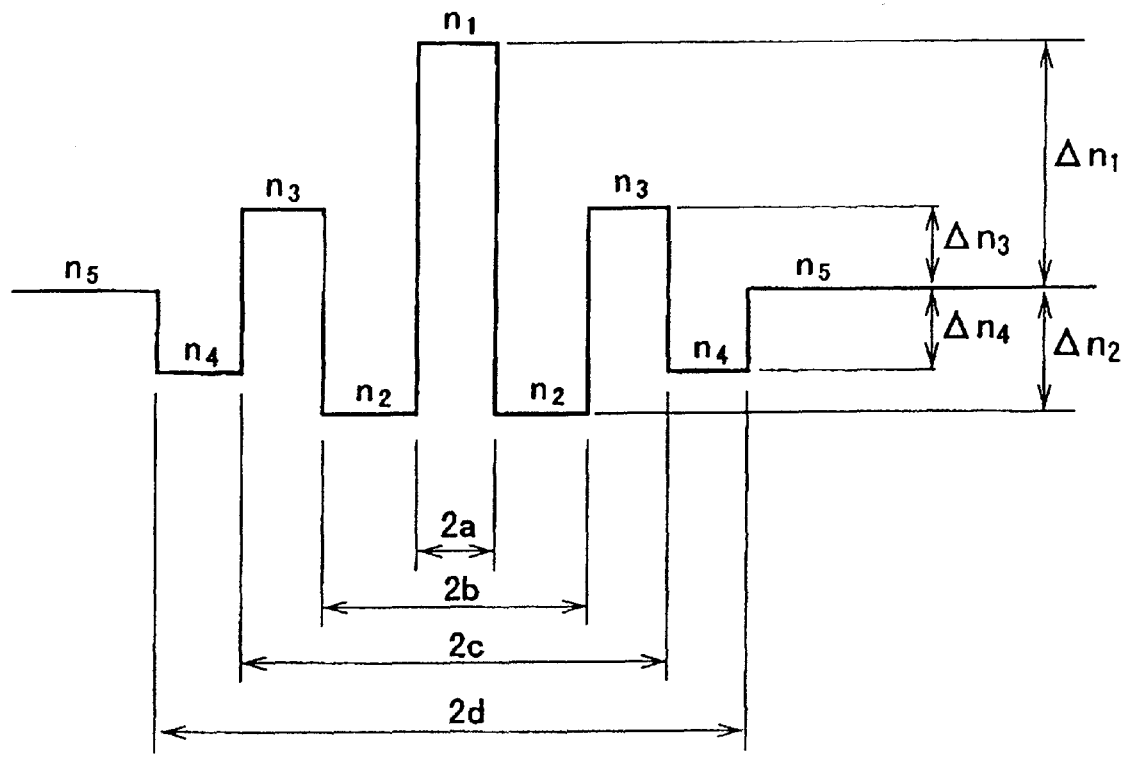
FIG. 7 shows a refractive index profile of an optical fiber according to Implementation Example 1 or Implementation Example 3.

The optical fibers used in Implementation Example 1 had the refractive index profile shown in FIG. 7: in the order of enumeration from the center of the optical axis, a central core region (outer diameter 2a, refractive index $n_1$), the 2nd core region (outer diameter 2b, refractive index $n_2$), the 3rd core region (outer diameter $2c$, refractive index $n_3$), the 4th core region (outer diameter $2d$, refractive index $n_4$), and the cladding region (refractive index $n_5$). The size relations between the respective refractive indices were $n_1 > n_2$, $n_2 < n_3$, $n_3 > n_4$, $n_4 < n_5$. Such a refractive index profile can be obtained by employing silica glass as a matrix, and adding $GeO_2$ to each of the central core region and the 3rd core region, and adding fluorine to each of the 2nd core region and the 4th core region, for example.

The outer diameter $2a$ of the central core region was 5.3 µm, the outer diameter $2b$ of the 2nd core region was 14.4 µm, the outer diameter $2c$ of the 3rd core region was 22.2 µm, and the outer diameter $2d$ of the 4th core region was 44.4 µm. Based on the refractive index $n_5$ of the cladding region, the relative refractive index difference $\Delta n_1$ of the central core region was 0.60%, the relative refractive index difference $\Delta n_2$ of the 2nd core region was −0.06%, the relative refractive index difference $\Delta n_3$ of the 3rd core region was 0.24%, and the relative refractive index difference $\Delta n_4$ of the 4th core region was −0.06%. At a wavelength of 1550 nm at a temperature of 20° C., the effective area of the optical fiber was 47 µm$^2$, the chromatic dispersion was 3.6 ps·nm$^{-1}$·km$^{-1}$, and the dispersion slope was 0.024 ps/nm$^2$/km.

Figure 10:
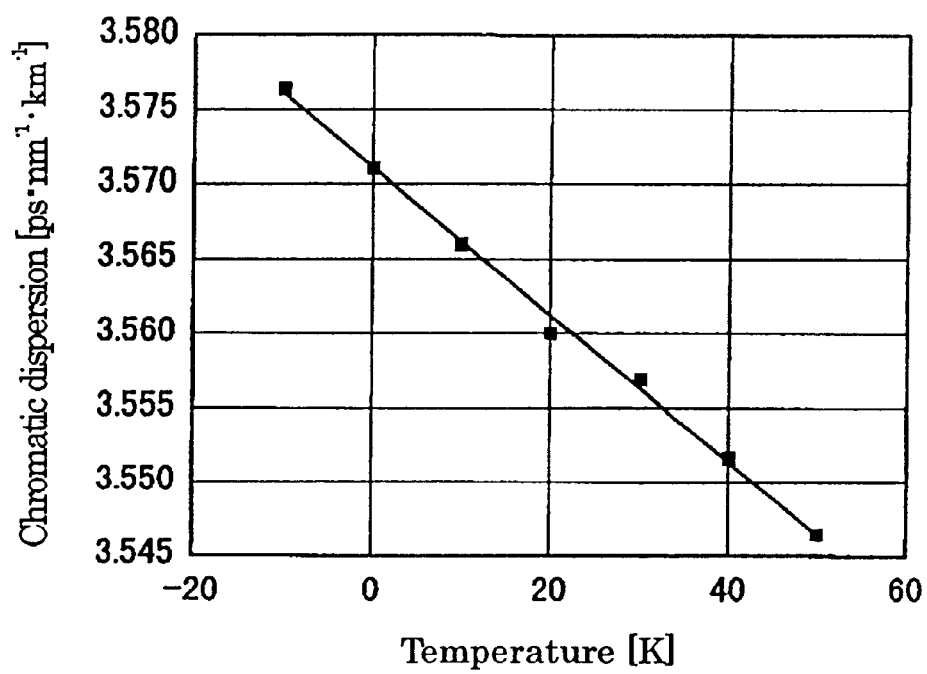
FIG. 10 is a graph showing a thermal characteristic of the chromatic dispersion of an optical fiber according to Implementation Example 1.

When such optical fibers were used in the fiber optic cable having a unit structure of FIG. 1, the variation quantity per unit temperature of the chromatic dispersion was −0.0005 ps·nm$^{-1}$·km$^{-1}$·K$^{-1}$ as shown in FIG. 10.

The optical fibers used in Implementation Example 2 had the refractive index profile shown in FIG. 8: in the order of enumeration from the center of the optical axis, a central core region (outer diameter $2a$, the maximum refractive index $n_1$), the 2nd core region (outer diameter $2b$, refractive index $n_2$), and the cladding region (refractive index $n_3$). The size relations between the refractive indices were $n_1 > n_2$ and $n_2 < n_3$. Such a refractive index profile can be realized by employing silica glass as a matrix, and adding $GeO_2$ to the central core region, and adding fluorine to the 2nd core region, for example.

The outer diameter $2a$ of the central core region was 7.9 µm, and the outer diameter $2b$ of the 2nd core region was 14.9 µm. Based on the refractive index $n_3$ of the cladding region, the relative refractive index difference $\Delta n_1$ of the central core region was 0.63%, and the relative refractive index difference $\Delta n_2$ of the 2nd core region was −0.30%. At a wavelength of 1550 nm and a temperature of 20° C., the effective area of the optical fibers was 38 µm$_2$, the chromatic dispersion was 5.5 ps·nm$^{-1}$·km$^{-1}$, and the dispersion slope was 0.013 ps/nm$^2$/km.

When the optical fibers were used in the fiber optic cable having a loose tubal structure as shown in FIG. 3, the variation quantity per unit temperature of the chromatic dispersion was −0.0004 ps·nm$^{-1}$·km$^{-1}$·K$^{-1}$.

The optical fiber used in Implementation Example 3 had the refractive index profile shown in FIG. 7. The outer diameter $2a$ of the central core region was 5.6 µm, the outer diameter $2b$ of the 2nd core region was 15.1 µm, the outer diameter $2c$ of the 3rd core region was 23.2 µm, and the outer diameter $2d$ of the 4th core region was 46.4 µm. Based on refractive index $n_5$ of the cladding region, the relative refractive index difference $\Delta n_1$ of the central core region was 0.54%, the relative refractive index difference $\Delta n_2$ of the 2nd core region was −0.15%, the relative refractive index difference $\Delta n_3$ of the 3rd core region was 0.26%, and the relative refractive index difference $\Delta n_4$ of the 4th core region was −0.15%. At the wavelength of 1550 nm and a temperature of 20° C. the optical fibers had an effective area of 51 µm$^2$, a chromatic dispersion of −7.5 ps·nm$^{-1}$·km$^{-1}$, and a dispersion slope of 0.008 ps/nm$^2$/km.

When the optical fibers were used in the fiber optic cable having a loose slotted structure shown in FIG. 5, the variation quantity of their chromatic dispersion per unit temperature was −0.0002 ps·nm$^{-1}$·km$^{-1}$·K$^{-1}$.

The optical fiber used in the Comparative Example had the refractive index profile shown in FIG. 9: in the order of enumeration from the center of an optical axis, a central core region (outer diameter $2a$, maximum refractive index $n_1$), the 2nd core region (outer diameter $2b$, refractive index $n_2$) and a cladding region (refractive index $n_3$), and the size relation between the refractive indices was $n_1 > n_2 > n_3$. Such a refractive index profile can be realized by employing silica glass as a matrix, and adding $GeO_2$ to each of the central core region and the 2nd core region, for example. The outer diameter $2a$ of the central core region was 3.9 µm, and the outer diameter $2b$ of the 2nd core region was 19.4 µm. Based on the refractive index $n_3$ of the cladding region, the relative refractive index difference $\Delta n_1$ of the central core region was 0.90%, and the relative refractive index difference $\Delta n_2$ of the 2nd core region was 0.10%. At a wavelength of 1550 nm and a temperature of 20° C., the effective area of the optical fibers was 58 µm$^2$, the chromatic dispersion was −2.0 ps·nm$^{-1}$·km$^{-1}$, and the dispersion slope was 0.090 ps/nm$^2$/km.

When the optical fibers were used in the fiber optic cable having a unit structure of FIG. 1, the variation quantity of the chromatic dispersion per unit temperature was −0.0025 ps·nm$^{-1}$·km$^{-1}$·K$^{-1}$.

As described above, the fiber optic cables in Implementation Examples 1 to 3 were provided with the optical fibers in which the absolute values of variation quantity of the chromatic dispersion per unit temperature were equal to or less than 0.0005 ps·nm$^{-1}$·km$^{-1}$·K$^{-1}$. Therefore, a long-distance signal light transmission can be performed at high bit rates by using such fiber optic cables even if any temporal temperature change or regional temperature difference occurs.

Next, the optical transmission system according to the present invention is explained.

Figure 11:
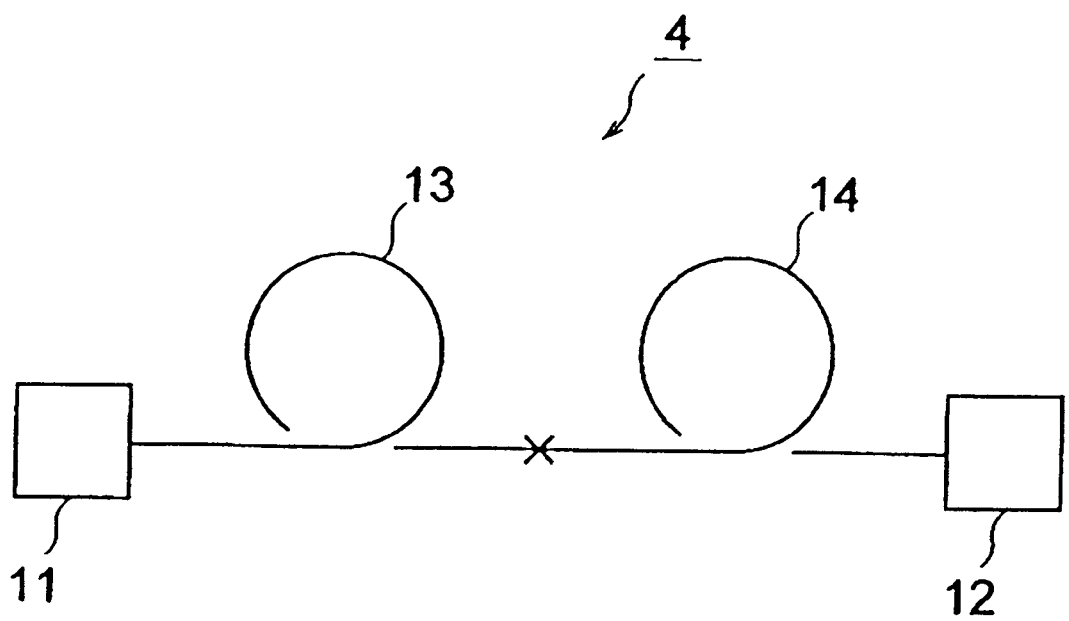
FIG. 11 is a schematic diagram of an optical transmission system.

The optical transmission system 4 shown in FIG. 11 is equipped with fiber optic cables 13 and 14 that are connected and installed as the optical transmission line between the transmitting station (or relay station) 11 and the receiving station (or relay station) 12. In the optical transmission system 4, the signal light sent out from the transmitting station 11 propagates through the fiber optic cables 13 and 14 to be received by the receiving station 12.

Preferably the fiber optic cables of the present invention mentioned above are used for fiber optic cables 13 and 14. In this case, it can perform a long-distance signal light transmission at high bit rates from the transmitting station 11 to the receiving station 12 notwithstanding any change in temporal temperature anywhere on the fiber optic cables 13 and 14.

It is also preferable to connect two kinds of optical fibers: a first optical fiber in which an absolute value of variation quantity of the chromatic dispersion per unit temperature at the wavelength of 1550 nm in the fiber optic cable 13 is 0.001 ps·nm$^{-1}$·km$^{-1}$·K$^{-1}$ or less (more preferably 0.0005 ps·nm$^{-1}$·km$^{-1}$·K$^{-1}$ or less) and the chromatic dispersion at the 1550 nm wavelength is positive and a second optical fiber in which an absolute value of variation quantity of the chromatic dispersion per unit temperature at the wavelength of 1550 nm in the fiber optic cable 14 is 0.001 ps·nm$^{-1}$·km$^{-1}$·K$^{-1}$ or less (more preferably 0.0005 ps·nm$^{-1}$·km$^{-1}$·K$^{-1}$ or less) and the chromatic dispersion at a wavelength of 1550 nm is negative.

In such case waveform degradation due to a nonlinear optical phenomenon can be restrained by giving the first and second optical fibers a predetermined absolute value of the chromatic dispersion at a wavelength of 1550 nm (preferably 2 ps·nm$^{-1}$·km$^{-1}$ or more, but 10 ps·nm$^{-1}$·km$^{-1}$ or less), respectively. Also, waveform degradation due to the accumulation of chromatic dispersions can be restrained by making the absolute value of the average chromatic dispersion at a wavelength of 1550 nm of the first and second optical fibers below a predetermined value (preferably equal to or less than 2 ps·nm$^{-1}$·km$^{-1}$).

Only one of the fiber optic cables 13 and 14 may be a fiber optic cable of the present invention. In such case, even if there is a temperature fluctuation, if the fiber optic cable of the present invention is installed in the area where the temporal temperature change is relatively great, whereas a conventional fiber optic cable is installed in the area where the temperature change is relatively small, a signal light transmission can be performed at high bit rates over a long distance from the transmitting station 11 to the receiving station 12. Then, the increase in cost of the optical transmission system can also be suppressed.

However, if there is a temporal temperature fluctuation at numerous points between the transmitting station 11 and the receiving station 12, it is preferable that the fiber optic cable according to the present invention is installed in at least 50% of the length of each section. Then, the fluctuations in the accumulation of the chromatic dispersions can be suppressed to a small amount even if there are temperature changes, and the signal light transmission can be performed over a long distance at high bit rates from the transmitting station 11 to the receiving station 12. The increase in cost of the optical transmission system can also be suppressed.

Figure 12:
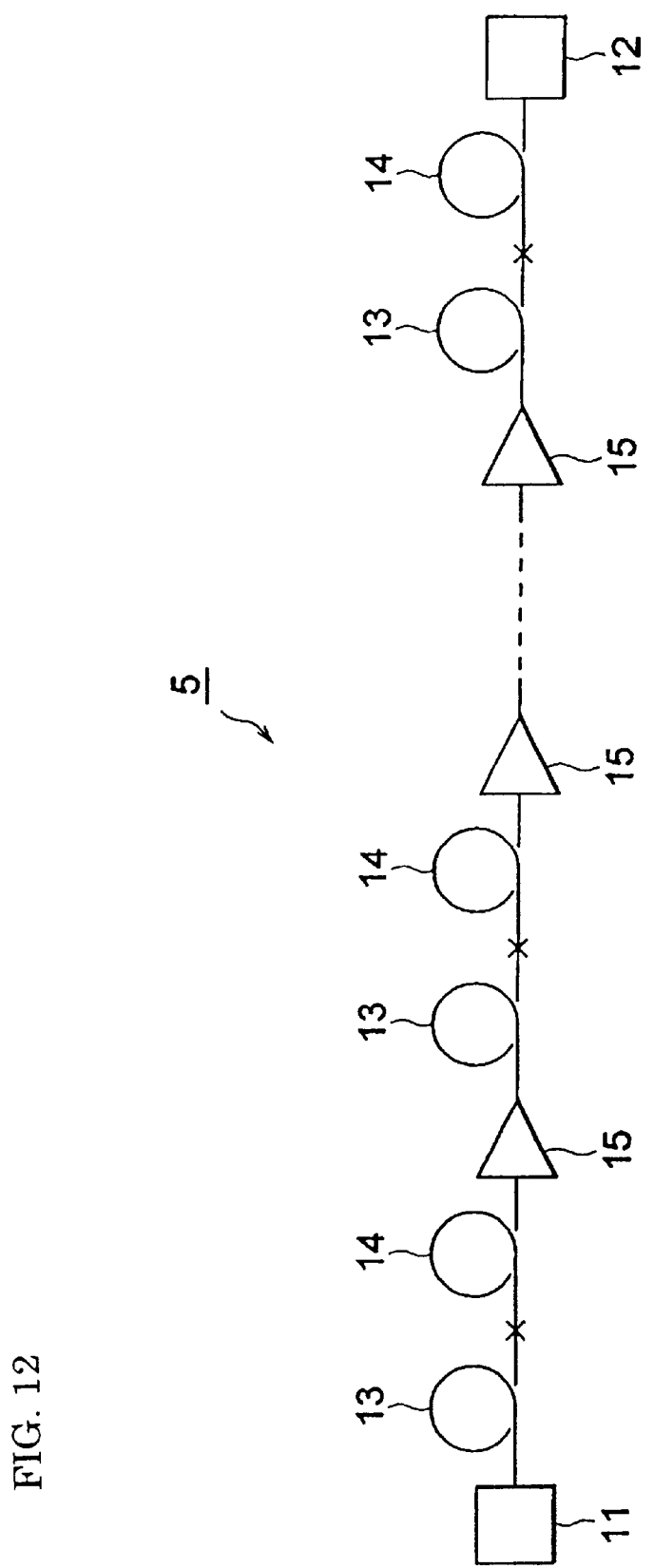
FIG. 12 is a schematic diagram of an optical transmission system.

The optical transmission system 5 shown in FIG. 12 is provided with a plurality of repeaters 15 between the transmitting station 11 and the receiving station 12, and the fiber optic cables 13 and 14 are connected and installed as an optical transmission line over each repeater section. In the optical transmission system 5, the signal light sent out from the transmitting station 11 propagates through the fiber optic cables 13 and 14 while the optical amplification thereof is done by the optical amplifiers in the repeaters 15, and is received by the receiving station 12. The fiber optic cables 13 and 14 are respectively the same as those referred to in FIG. 11.

What is claimed is:

1. A fiber optic cable comprising a plurality of optical fibers bundled therein, wherein one or more of said plurality of optical fibers have an absolute value of 0.001 ps·nm$^{-1}$·km$^{-1}$·K$^{-1}$ or less of chromatic dispersion variation quantity per unit temperature at a wavelength of 1550 nm.

2. A fiber optic cable as defined in claim 1, wherein one or more of said plurality of optical fibers have an absolute value of 0.0005 ps·nm$^{-1}$·km$^{-1}$·K$^{-1}$ or less of chromatic dispersion variation quantity per unit temperature at a wavelength of 1550 nm.

3. A fiber optic cable as defined in claim 1, wherein said fiber optic cable has a loose tubal structure or loose slotted structure.

4. An optical transmission system comprising a fiber optic cable as an optical transmission line, wherein one or more optical fibers contained in said fiber optic cable have an absolute value of 0.001 ps·nm$^{-1}$·km$^{-1}$·K$^{-1}$ or less of chromatic dispersion variation quantity per unit temperature at a wavelength of 1550 nm.

5. An optical transmission system as defined in claim 4, wherein at least two fiber optic cables are connected as an optical transmission line such that a first fiber optic cable contains said one or more optical fibers having a positive chromatic dispersion at a wavelength of 1550 nm and a second fiber optic cable contains said one or more optical fibers having a negative chromatic dispersion at a wavelength of 1550 nm, and such two kinds of fibers having an opposite chromatic dispersion are connected to each other.

6. An optical transmission system as defined in claim 5, wherein the absolute value of the chromatic dispersion at a wavelength of 1550 nm of said one or more optical fibers contained in said first fiber optic cable and that of said one or more optical fibers contained in said second fiber optic cable are 2 ps·nm$^{-1}$·km$^{-1}$ or more but 10 ps·nm$^{-1}$·km$^{-1}$ or less, respectively.

7. An optical transmission system as defined in claim 5, wherein the absolute value of the average chromatic dispersion at a wavelength of 1550 nm of said one or more optical fibers contained in said first and second fiber optic cables is 2 ps·nm$^{-1}$·km$^{-1}$ or less.

8. An optical transmission system as defined in claim 4, wherein said fiber optic cable is installed in 50% or more in a portion of the length of each section.

\* \* \* \* \*